(12) United States Patent
Fraundorfer

(10) Patent No.: US 10,457,387 B2
(45) Date of Patent: Oct. 29, 2019

(54) AUTOGYRO WITH A STREAMLINED OUTER CONTOUR

(71) Applicant: Christoph Fraundorfer, Neuberg A.D. Donau (DE)

(72) Inventor: Christoph Fraundorfer, Neuberg A.D. Donau (DE)

(73) Assignee: Christoph Fraundorfer, Neuburg A.D. Donau (DE)

( * ) Notice: Subject to any disclaimer, the term of this patent is extended or adjusted under 35 U.S.C. 154(b) by 346 days.

(21) Appl. No.: 15/535,485

(22) PCT Filed: Dec. 16, 2015

(86) PCT No.: PCT/EP2015/080034
§ 371 (c)(1),
(2) Date: Jun. 13, 2017

(87) PCT Pub. No.: WO2016/097006
PCT Pub. Date: Jun. 23, 2016

(65) Prior Publication Data
US 2017/0327210 A1 Nov. 16, 2017

(30) Foreign Application Priority Data
Dec. 19, 2014 (DE) .......................... 10 2014 119 273

(51) Int. Cl.
*B64C 27/02* (2006.01)
*B64C 27/82* (2006.01)

(52) U.S. Cl.
CPC ...... *B64C 27/02* (2013.01); *B64C 2027/8281* (2013.01)

(58) Field of Classification Search
CPC .................. B64C 27/02; B64C 2027/8281
See application file for complete search history.

(56) References Cited

U.S. PATENT DOCUMENTS 2,405,244 A * 8/1946 Stanley ............... B64C 27/02
244/17.21
4,010,919 A 3/1977 Breuner
(Continued)

FOREIGN PATENT DOCUMENTS

AT 334215 1/1977
CN 102161380 A 8/2011
(Continued)

OTHER PUBLICATIONS

German Search Report, dated Oct. 15, 2015.
(Continued)

*Primary Examiner* — Philip J Bonzell
*Assistant Examiner* — Michael B. Kreiner
(74) *Attorney, Agent, or Firm* — Dority & Manning, P.A.

(57) ABSTRACT

The invention related to an autogyro (1) comprising a body (2), a mast (3) arranged in the upper region of the body, a rotor (4) which is rotatably arranged in the region of the end of the body (3) and which can be put into autorotation by an air flow, a drivable propeller (6) which is arranged in the region of a rear body end (5) and which generates a propulsion of the autogyro (1), a guide mechanism (7) arranged behind a propeller (1), and at least one brace (8) which extends past the propeller in the longitudinal direction of the autogyro at a radial distance from the propeller (6) in an outwards direction and which connects the guide mechanism (7) to the body (2). According to the invention, the guide mechanism (7) has a guide mechanism protrusion (9) which is arranged coaxially to the rear body end (5) and which extends forwards from the guide mechanism (7) in the direction of the rear body end (5) at a distance therefrom. Furthermore, at least the region of the rear body end (5) of the body (2) and the guide mechanism protrusion (9) together form a streamlined outer contour. The invention (Continued)

further relates to an autogyro in which the mast (3) is designed, in particular the mast is arranged and/or inclined relative to the propeller (6), such that when rotating, the blades (17) of the propeller (6) always only partly overlap with the mast (3) in a respective overlap region (21) when viewing the autogyro (1) from the rear.

17 Claims, 6 Drawing Sheets

(56) References Cited

U.S. PATENT DOCUMENTS

| | | | | |
|---|---|---|---|---|
| 5,301,900 | A * | 4/1994 | Groen | B64C 27/43 |
| | | | | 244/17.25 |
| 5,544,844 | A | 8/1996 | Groen et al. | |
| 7,448,571 | B1 * | 11/2008 | Carter, Jr. | B64C 27/02 |
| | | | | 244/17.11 |
| 7,815,144 | B2 * | 10/2010 | Molnar | B62K 13/00 |
| | | | | 244/17.11 |
| 9,611,037 | B1 * | 4/2017 | Groen | B64C 27/82 |
| 2002/0005455 | A1 * | 1/2002 | Carter, Jr. | B64C 27/02 |
| | | | | 244/8 |
| 2008/0251308 | A1 | 10/2008 | Molnar et al. | |
| 2012/0025011 | A1 * | 2/2012 | Hsueh | B64C 27/025 |
| | | | | 244/17.11 |
| 2012/0248240 | A1 | 10/2012 | Polovinkin | |
| 2016/0129988 | A1 * | 5/2016 | Meier | B64C 27/52 |
| | | | | 244/17.21 |

FOREIGN PATENT DOCUMENTS

| | | | |
|---|---|---|---|
| DE | 69315427 T2 | 7/1998 | |
| EP | 2279943 A1 | 2/2011 | |
| FR | 1265234 A * | 5/1961 | B60F 5/02 |
| GB | 1258505 A * | 12/1971 | B64C 27/02 |

OTHER PUBLICATIONS

Written Opinion of the International Searching Authority (PCT/EP2015/080034), dated Feb. 24, 2016.
International Search Report (PCT/EP2015/O80034), dated Feb. 24, 2016.
English translation of the International Preliminary Report on Patentability (PCT/EP2015/080034), dated Jun. 20, 2017.

* cited by examiner

AUTOGYRO WITH A STREAMLINED OUTER CONTOUR

FIELD OF THE INVENTION

The present invention relates to a gyroplane with a fuselage, with a mast arranged in the upper area of the fuselage, and with a rotor, which can be arranged in a rotatable manner in the area of the end of the mast and can be set in autorotation by an air flow. The gyroplane also comprises a propeller that is arranged and drivable in the rear area of the fuselage, which produces the propulsion of the gyroplane, and a horizontal stabilizer arranged behind the propeller. At least one strut, which extends from the propeller, spaced from it in a radially outward direction, in the longitudinal direction of the gyroplane, connects the horizontal stabilizer to the fuselage.

BACKGROUND

The beginnings of gyroplanes, also known as gyrocopters or autogyros, are traced back to the 1920s; thus, they are widely known in aeronautical engineering, and are part of its basic training regarding the state of the art.

A gyroplane can also be classified in the category of rotary wing aircraft. Another form of rotary wing aircraft is the helicopter, which features a main rotor driven by a motor. By contrast, the gyroplane features a main rotor that can be set in rotation by means of autorotation, which generates lift. In this case, the main rotor is not explicitly driven by a motor, which eliminates the need for a torque-compensating tail rotor.

DE 693 15 427 T2 discloses such a gyroplane. Additional features of the gyroplane include the fuselage, which includes all instruments and equipment supporting flight, such as the drive motor, and also the cabin for passengers. At a rear end of the fuselage, a propeller is arranged; this produces the propulsion of the gyroplane. Behind the propeller, a horizontal stabilizer is arranged; this serves the purpose of stabilization, but also has an elevator and/or a rudder, with which the gyroplane is controlled. The horizontal stabilizer is attached to the fuselage by means of a strut. However, a disadvantage of this design is that, behind the propeller, turbulence in an air flow arises. Thus, the horizontal stabilizer is subject to turbulent flowthrough. This leads to an increased resistance to flow and thus, among other things, to increased fuel consumption. Furthermore, the flight stability and the maneuverability of the gyroplane are impaired.

Therefore, the task of the invention is to provide a gyroplane with improved stability and maneuverability characteristics and reduced air resistance.

SUMMARY OF THE INVENTION

The task is achieved by means of a gyroplane according to the independent claims 1 and 14.

A gyroplane with a fuselage is proposed. Preferably, a part of the fuselage is designed as a passenger cabin. However, the fuselage may also include all of the other components required for the operation of the gyroplane, such as, for example, the fuel tank, instruments and the drive motor. In an upper area of the fuselage, a mast is arranged; this features a rotor that is rotatably arranged in the area of its end. The rotor can be displaced by an air flow in autorotation, such that lift of the gyroplane is generated. In addition, the rotor can be driven by a pre-rotator, which sets the rotor in rotation for starting, in particular when the gyroplane has not yet traveled. As a result, the required take-off distance for lifting tile gyroplane can be shortened. By means of the mast, the lift generated by the rotor is transferred to the fuselage. In general, the air flow arises through a relative speed of the gyroplane against the surrounding air; thus, it is essentially provided by the air stream and thus flows from the direction of the flight direction to the gyroplane. A drivable propeller is arranged in a rear area of the fuselage. This is driven, in particular, by a combustion engine and generates the propulsion of the gyroplane. A horizontal stabilizer is arranged at least partially behind the propeller. Preferably, the horizontal stabilizer comprises a rudder and/or an elevator with which the gyroplane can be controlled. The horizontal stabilizer is connected to the fuselage by means of at least one strut, which extends from the propeller, spaced from it in a radially outward direction, in the longitudinal direction of the gyroplane. The strut forms a primary load path, which relays the weight and the air loads of the horizontal stabilizer to the fuselage through at least one strut. Thus, in a rear view of the gyroplane, the strut extends to the circular propeller movement area in a manner radially spaced from the propeller. Through the indirect connection of the horizontal stabilizer to the fuselage by means of the at least one strut, the horizontal stabilizer and the propeller can be mutually decoupled from vibrations. Here, "decoupled from vibrations" accordingly means that vibrations from the horizontal stabilizer, which can arise due to air flows, cannot be transferred to the propeller, in particular the motor shaft. Likewise, vibrations that the propeller and/or its drive motor generate, in particular from the motor shaft, are prevented from being transferred to the horizontal stabilizer. The motor shaft may preferably be designed as a solid shaft or a hollow shaft.

According to the invention, the horizontal stabilizer features a horizontal stabilizer extension arranged in a coaxial manner with respect to the rear fuselage end. This extends in the longitudinal direction of the gyroplane from the horizontal stabilizer outwards and forwards in the direction of the rear fuselage end. Furthermore, the horizontal stabilizer extension, in particular its end on the fuselage side, is spaced from the rear fuselage end. Here, the horizontal stabilizer extension can be spaced, in particular, in the longitudinal direction of the gyroplane. In addition or alternatively, the horizontal stabilizer extension can be spaced in the radial direction relative to the longitudinal axis of the gyroplane. In this case, the horizontal stabilizer extension can partially overlap with the fuselage end and/or a propeller extension in the longitudinal direction of the gyroplane. Preferably, in this case, the free end of the horizontal stabilizer extension partially projects into an opening of the rear fuselage end and/or the propeller extension. Here, it is preferable that the rear fuselage end and/or the free end of the propeller extension is arranged radially outside with respect to the horizontal stabilizer extension behind it and the free end of the horizontal stabilizer extension is arranged radially inside it. As a result, air can flow in a close-fitting manner from the fuselage end and/or the propeller extension to the horizontal stabilizer extension. Thus, the horizontal stabilizer extension is spaced from the rear fuselage end and/or propeller, in particular in relation to the longitudinal axis of the gyroplane, in the longitudinal and/or radial direction, in such a manner that a gap is formed in the area between such two pieces, in particular directly between such two pieces. At this, the gap can feature, for example, a substantially cylindrical and/or conical shape. In particular, a cooling air outlet of the drive unit can also be provided by means of the gap.

Furthermore, at least one part can be formed as a hollow cylinder and/or a hollow cone. The horizontal stabilizer extension is preferably connected to the horizontal stabilizer and/or passes backwards in its contour into the horizontal stabilizer, in particular into the side horizontal stabilizer. Thus, the horizontal stabilizer extension flows smoothly into the horizontal stabilizer, in particular the side horizontal stabilizer. The side horizontal stabilizer is the part of the horizontal stabilizer that extends in the vertical direction of the gyroplane. In addition, the term "side horizontal stabilizer" is to be understood as the fixed part and the term "rudder" is to be understood as the movable part or surface. The horizontal stabilizer, in particular the side horizontal stabilizer, and the horizontal stabilizer extension are preferably formed in one piece. In addition, the fuselage, at least in the area of its rear fuselage end, and the horizontal stabilizer extension together form a streamlined outer contour. For such a streamlined outer contour, the air flow around the fuselage, in particular around the area of the rear fuselage end, is transferred to the horizontal stabilizer extension and to the horizontal stabilizer. Thus, the horizontal stabilizer, in particular the side horizontal stabilizer, is subjected to a homogeneous flowthrough of the air flow, as a result of which the controlling effect of the rudder is improved. A streamlined outer contour also has the advantage that an air flow flowing around this outer contour is formed in a manner that is substantially close-fitting. Close-fitting flows feature only little to no turbulence. Less turbulence leads to low fuel consumption, a more stable flight behavior of the gyroplane and lower noise development. Thus, by means of the horizontal stabilizer extension, the air flow can be guided essentially in a close-fitting manner from the area of the fuselage end to the horizontal stabilizer. Furthermore, the drive unit arranged in the area of the fuselage end, in particular a motor shaft and/or the propeller, and the horizontal stabilizer are decoupled from vibrations from each other. The horizontal stabilizer extension is not directly connected to the fuselage in the area of the fuselage end; rather, it is indirectly connected to it by means of the at least one strut. The fuselage end and the horizontal stabilizer extension are spaced from each other in the longitudinal direction of the gyroplane.

An advantageous additional form of the invention is that, in the area behind the propeller, a propeller extension is arranged, which preferably extends in a coaxial manner towards the rear in the direction of the horizontal stabilizer extension. The horizontal stabilizer extension can be made shorter by means of the propeller extension, which extends towards the horizontal stabilizer extension. As a result of this shortening of the horizontal stabilizer extension, the weight of the horizontal stabilizer extension is also reduced, which leads to an unburdening of the horizontal stabilizer. The propeller extension also provides a streamlined outer contour of the fuselage, in particular of the area of the rear fuselage end, of the propeller extension and of the horizontal stabilizer extension. In addition, the horizontal stabilizer, in particular the side horizontal stabilizer, is flowed through by a close-fitting air flow. The propeller extension can also be formed in such a manner that it acts as a radial fan, in particular for the drive unit.

In addition, it is advantageous if the propeller extension is spaced from the horizontal stabilizer extension, in order to decouple both extensions from vibrations. The vibrations generated by the propeller are not transferred by the propeller to the horizontal stabilizer extension and thus to the horizontal stabilizer. Likewise, vibrations are also not transferred from the horizontal stabilizer to the propeller, and in particular not via a motor shaft to the drive unit. This is advantageous, since vibrations of a component lead to increased wear, and in this case bring about premature damages to the drive unit. Flight performance is also improved, since a vibrating horizontal stabilizer also swirls the surrounding air, thus adversely affecting the behavior and flight performance. At this, the horizontal stabilizer extension can be spaced, in particular, in the longitudinal direction of the gyroplane. In addition or alternatively, the horizontal stabilizer extension can be spaced in the radial direction relative to the longitudinal axis of the gyroplane. In this case, the horizontal stabilizer extension can partially overlap with the propeller extension, viewed in the longitudinal direction of the gyroplane. At this, the front propeller extension, viewed in relation to the direction of travel, is arranged radially outside with respect to the horizontal stabilizer extension behind it and the horizontal stabilizer extension is arranged radially inside. As a result, air can flow in a close-fitting manner from the propeller extension to the horizontal stabilizer extension.

In addition or alternatively, it is advantageous if the propeller extension, together with the fuselage, forms a continuous, streamlined outer contour at least in the area of its rear fuselage end and the horizontal stabilizer extension. This also leads to a close-fitting flow around such an outer contour, which results in lower fuel consumption, less noise development and the smoother flight behavior of the gyroplane.

It is also advantageous if the propeller extension and the horizontal stabilizer extension are the same length, or if one of the two extensions is formed to be longer than the other. Since the two extensions are spaced from each other, they thus form a gap. Likewise, a short horizontal stabilizer extension leads to (for example) a long propeller extension (and vice versa). A short horizontal stabilizer extension features a correspondingly lower weight, which in turn unburdens the horizontal stabilizer. In the event that the propeller extension is connected to the propeller in a torque-proof manner, it can be advantageous if the propeller extension is short. As a result, less mass of the propeller extension is co-rotated; such mass would have negative effects in the case of imbalances in the propeller extension. If both extensions feature the same lengths, a compromise of both effects, a short horizontal stabilizer extension and a short propeller extension, can be achieved.

Furthermore, it is advantageous if the propeller and/or the horizontal stabilizer extension is formed to be rotationally symmetrical around a longitudinal axis. The rotationally symmetrical shape of the extensions is particularly easy to design and manufacture, which saves costs in manufacturing and development. Moreover, such a form provides aerodynamic advantages.

An additional advantage is that the propeller is formed as a rotary propeller. Herein, the rotary propeller features a hollow shaft, which rotates around an axis. By means of this hollow shaft, in the longitudinal direction of the gyroplane, a retaining element (for example) for the propeller extension can be provided, by means of which the propeller extension is connected to the fuselage. Thus, the fuselage, the retaining element and the propeller extension preferably form a common unit. Thus, the end of the propeller extension preferably forms the fuselage end. Thus, the propeller is spaced forwards in the longitudinal direction of the gyroplane or from the end of the propeller extension in relation to the direction of flight. Preferably, the hollow shaft is rotatably mounted on the retaining element. As a result, the propeller extension can be fixed with respect to the rotating propeller, and can be connected in a torque-proof manner to the fuselage. Since the propeller extension thus does not rotate with the propeller, the overall rotating mass is reduced. By reducing the rotating masses, vibrations caused by unbalances of the rotating masses are reduced.

If the propeller extension is formed as a part of the fuselage, this has further advantages. As a result, the propeller extension does not have to be designed as a single component, but can be manufactured with the fuselage as one unit. This saves costs for development. Advantageously, the fuselage is formed in one piece in the area of its fuselage end and the propeller extension. Preferably, in this case, the free end of the propeller extension forms the rear fuselage end. The propeller, preferably formed as a rotary propeller, is then spaced in the direction of flight from the rear fuselage end or from the free end of the propeller extension.

It is also advantageous if the propeller is arranged rotatably on the rear fuselage end, in particular on a motor shaft projecting beyond the rear fuselage end, whereas the motor shaft preferably is formed as a solid shaft. This arrangement simplifies the design of the gyroplane. It is also possible to easily install and/or remove the propeller, since no other components have to be removed. In order to save weight, on the other hand, the motor shaft can also be formed as a hollow shaft.

It is advantageous if the propeller extension is formed as a part of the propeller and/or is connected to it in a torque-proof manner. This rotates the propeller extension with the propeller. This also simplifies the design and thus production costs.

It is advantageous if the gap is formed directly between the rear fuselage end, which (in particular in the case of a rotary propeller) can be formed by the free end of the propeller extension, and the end of the horizontal stabilizer extension. Thus, in this case, the gap extends from the horizontal stabilizer extension, in particular from the free end thereof pointing in the direction of flight, to the fuselage, in particular up to its rear fuselage end and/or propeller extension pointing counter to the direction of flight.

It is also advantageous if the gap is formed indirectly between the rear fuselage end and the free end of the horizontal stabilizer extension. In this case, the fuselage preferably features a rotatable propeller extension, whereas the gap is preferably formed directly between the propeller extension and the horizontal stabilizer extension. Thus, in this case, the gap extends from the horizontal stabilizer extension, in particular from its end pointing in the direction of flight, to the propeller extension, in particular up to its end pointing in the direction of flight.

In order to, despite the vibration decoupling caused by the gap, be able to ensure a certain constant spacing of the horizontal stabilizer, it is advantageous if the gyroplane features a damping element, A secondary load path extends over the damping element; this transfers traction forces and/or compressive forces, which the horizontal stabilizer generates through a movement in the longitudinal direction of the gyroplane, in particular opposite to the rear fuselage end, without noticeably changing the extent of the gap. The damping element comprises a bearing that is decoupled from vibrations, such as an elastomer bearing, such that the damping element transfers no vibrations or only very few vibrations. The damping element preferably extends in a partial area of the gap (that is, not over the entire volume of free space formed by the gap) over the entire length of the gap. Herein, the length of the gap is formed by the distance between two mutually adjacent and different components of the streamlined and multi-part fuselage unit, in particular the horizontal stabilizer extension and the propeller extension. The damping element preferably connects the horizontal stabilizer extension to the fuselage and/or the propeller extension in a vibration-damping manner.

It is also advantageous if the damping element is connected in a torque-proof manner at its one end to the horizontal stabilizer extension, and/or is formed in one piece with the horizontal stabilizer extension. In particular, in the case of a rotary propeller, it is advantageous if the damping element is connected in a torque-proof manner at its other end to the propeller extension. Alternatively, in the case of a propeller extension rotating with the propeller, it is advantageous if the damping element is connected in a rotatably mounted manner at its other end to the propeller extension.

It is advantageous if the at least one strut is connected directly or indirectly, in particular via a wing, to the fuselage.

It is also advantageous if the horizontal stabilizer is connected to the fuselage by means of a strut, in particular a single strut, which extends centrally in the longitudinal direction relative to the gyroplane. A single strut is a material-saving and thus cost-saving method for connecting the horizontal stabilizer to the fuselage. In addition, weight is saved, which improves the flight performance of the gyroplane.

An additional advantageous design is that at least one wing is arranged at the side of the fuselage. Herein, such wings can be directed slightly downwards or upwards. Likewise, the wings can be designed as bent wings, as a result of which the wings feature a bend that is, for the most part, upwards. Furthermore, the wings may feature so-called "winglets" at their ends. In general, the winglets serve to reduce whirls that are generated at the outer tips of wings. Thus, such winglets reduce flight resistance, and thus save fuel. All such embodiments serve the purpose of, on the one hand, a further lift, which each wing features, and, on the other hand, the stabilization of the gyroplane during flight.

If the horizontal stabilizer is connected to the fuselage by means of two struts extending in the longitudinal direction on a respective wing, this brings about additional advantages. At this, the struts are preferably arranged in an area in the center of the wings. Thus, the horizontal stabilizer is more rigidly attached to the fuselage and can thus be dimensioned to be larger, in order to increase the stabilizing and controlling effect of the horizontal stabilizer.

An additional advantage is that the horizontal stabilizer is connected to the fuselage by means of two struts. Two struts increase the load capacity of the horizontal stabilizer. Likewise, a connection of the struts directly to the fuselage is particularly easy to carry out and construct, since no intermediate elements are required.

In addition, it is advantageous if the horizontal stabilizer features three horizontal stabilizer sections. At least one of such horizontal stabilizer sections is formed as a side horizontal stabilizer. The three preferably vertical sections are advantageously spaced from each other in the transverse direction of the gyroplane. Preferably, the middle horizontal stabilizer section is formed as a side horizontal stabilizer. In addition or alternatively, the two outer horizontal stabilizer sections can also be formed as a side horizontal stabilizer. Through the three horizontal stabilizer sections, the gyroplane is also stable against a rotation around a vertical axis.

It is also advantageous if the horizontal stabilizer sections are formed to taper downward. This saves material, and thus costs and weight, of the gyroplane. Aerodynamic properties, such as air resistance of the horizontal stabilizer sections, are improved.

A further advantageous additional form is that the horizontal stabilizer, at its upper side, features a support section arranged in the transverse direction of the gyroplane and/or, at such support section, the horizontal stabilizer sections are arranged in a manner directed downwards, such that two adjacent horizontal stabilizer sections and a part of the support section form a U-shape that is directed downwards. Thus, in the case of three horizontal stabilizer sections, two downwardly directed U-shapes are formed adjacent to each other in the transverse direction of the gyroplane. These stabilize the gyroplane against a rotation around a vertical axis of the gyroplane and a transverse axis of the gyroplane.

It is advantageous if the support section and the two outer horizontal stabilizer sections form one unit that is connected to the middle horizontal stabilizer section.

Preferably, the middle horizontal stabilizer section is designed as a rudder. However, it would also be conceivable for the two outer horizontal stabilizer sections to be configured as rudders. This increases the controlling effect of the horizontal stabilizer.

A gyroplane with a fuselage is proposed. Preferably, a part of the fuselage is designed as a passenger cabin. However, the fuselage may also include all of the other components required for the operation of the gyroplane, such as, for example, the fuel tank, instruments and the drive motor. In an upper area of the fuselage, a mast is arranged; this features a rotor that is rotatably arranged in the area of its end. The rotor can be displaced by an air flow in autorotation, such that lift of the gyroplane is generated. In addition, the rotor can be driven by a pre-rotator, which sets in rotation the rotor for starting, in particular when the gyroplane has not yet traveled. As a result, lift is already generated for starting, and the time until the gyroplane lifts off from the ground is shortened. By means of the mast, the lift generated by the rotor is transferred to the fuselage. In general, the air flow arises through a relative speed of the gyroplane against the surrounding air; thus, it is essentially provided by the air stream and thus flows from the direction of the flight direction to the gyroplane. A drivable propeller is arranged in a rear area of the fuselage. This is driven, in particular, by a combustion engine and generates the propulsion of the gyroplane. A horizontal stabilizer is arranged partially behind the propeller. Preferably, the horizontal stabilizer comprises a rudder and/or an elevator with which the gyroplane can be controlled. The horizontal stabilizer is connected to the fuselage by means of at least one strut, which extends from the propeller, spaced from it in a radially outward direction, in the longitudinal direction of the gyroplane. The strut forms a primary load path, which relays the weight and the air loads of the horizontal stabilizer to the fuselage through at least one strut. Thus, in a rear view of the gyroplane, the strut extends to the circular propeller movement area in a manner radially spaced from the propeller. Through the indirect connection of the horizontal stabilizer to the fuselage by means of the at least one strut, the horizontal stabilizer and the propeller can be mutually decoupled from vibrations. Here, "decoupled from vibrations" accordingly means that vibrations from the horizontal stabilizer, which can arise due to air flows, cannot be transferred to the propeller, in particular the motor shaft. Likewise, vibrations that the propeller and/or its drive motor generate, in particular from the motor shaft, are prevented from being transferred to the horizontal stabilizer. The motor shaft may preferably be designed as a solid shaft or a hollow shaft.

According to the invention, the mast is formed, in particular, arranged and/or inclined relative to the propeller, in such a manner that, in a rear view of the gyroplane, the propeller blades of the propeller always overlap only partially with the mast in a respective overlapping area during rotation. As a result, at no point in time is the propeller blade completely in the lee of the mast.

The inflow of the propeller resulting from the flight speed and the propulsion brings about a force on the propeller blades directed in the direction of flight. If a propeller blade disappears behind the mast or dips into the lee of the mast, the lee or caster of the mast brings about a change in the resulting inflow, which results in a sudden load change. However, at this point in time, the at least one other propeller blade is not located in the lee or caster of the mast, and experiences a virtually undisturbed inflow, which consequently brings about a uniform force on the propeller blade. The force oscillating in various strengths at the propeller blades leads to oscillating loads and faster wear. On the other hand, the oscillating forces on the propeller blades also produce vibrations, which likewise spread to the fuselage, lead to the material fatigue of the components there and can be uncomfortable for the persons in the gyroplane.

Due to the fact that the propeller blades never lie completely in the lee or caster of the mast, but are always flowed through without disturbance over a substantial area, the oscillating force is lessened, which results in a lower material fatigue of the components and a reduction in the vibrations.

One advantage is that the mast is formed in several parts. Thus, the mast can be formed (for example) in two parts, with two side (in particular, parallel) parts, which are preferably spaced from each other in the transverse direction of the gyroplane. The side parts are connected at one end to the fuselage, A roof part is preferably arranged on the end of the side parts opposite to the fuselage; such roof part connects the side parts and rotatably accommodates the rotor. Alternatively, the side parts can also be inclined in the direction of the center of the gyroplane, such that they run towards each other in the direction of the rotor, and/or the roof part features a smaller extent. Likewise, the side parts can be inclined in such a manner that they converge at their end turned away from the fuselage. This means that the roof part can be dispensed with. Herein, the side parts need not be inclined in the transverse direction of the gyroplane. It is also conceivable that the side parts are spaced in the longitudinal direction of the gyroplane. In addition, a combination of side parts, which are spaced in the transverse direction and/or longitudinal direction, is also possible. At this, a multi-part mast has higher degree of stability.

Furthermore, it is advantageous if the mast is curved, in particular in a concave and/or convex manner in the transverse direction of the gyroplane. In addition or alternatively, the mast may also feature a bend to the outside. By means of (for example) concave shape of the mast and a straight propeller blade, the overlapping area is formed in a simple manner. As described above, this results in a reduction in vibrations, a reduction in the wear of the components and lower noise development.

BRIEF DESCRIPTION OF THE DRAWINGS

Further advantages of the invention are described in the following embodiments, The following is shown.

DETAILED DESCRIPTION

Figure 1:
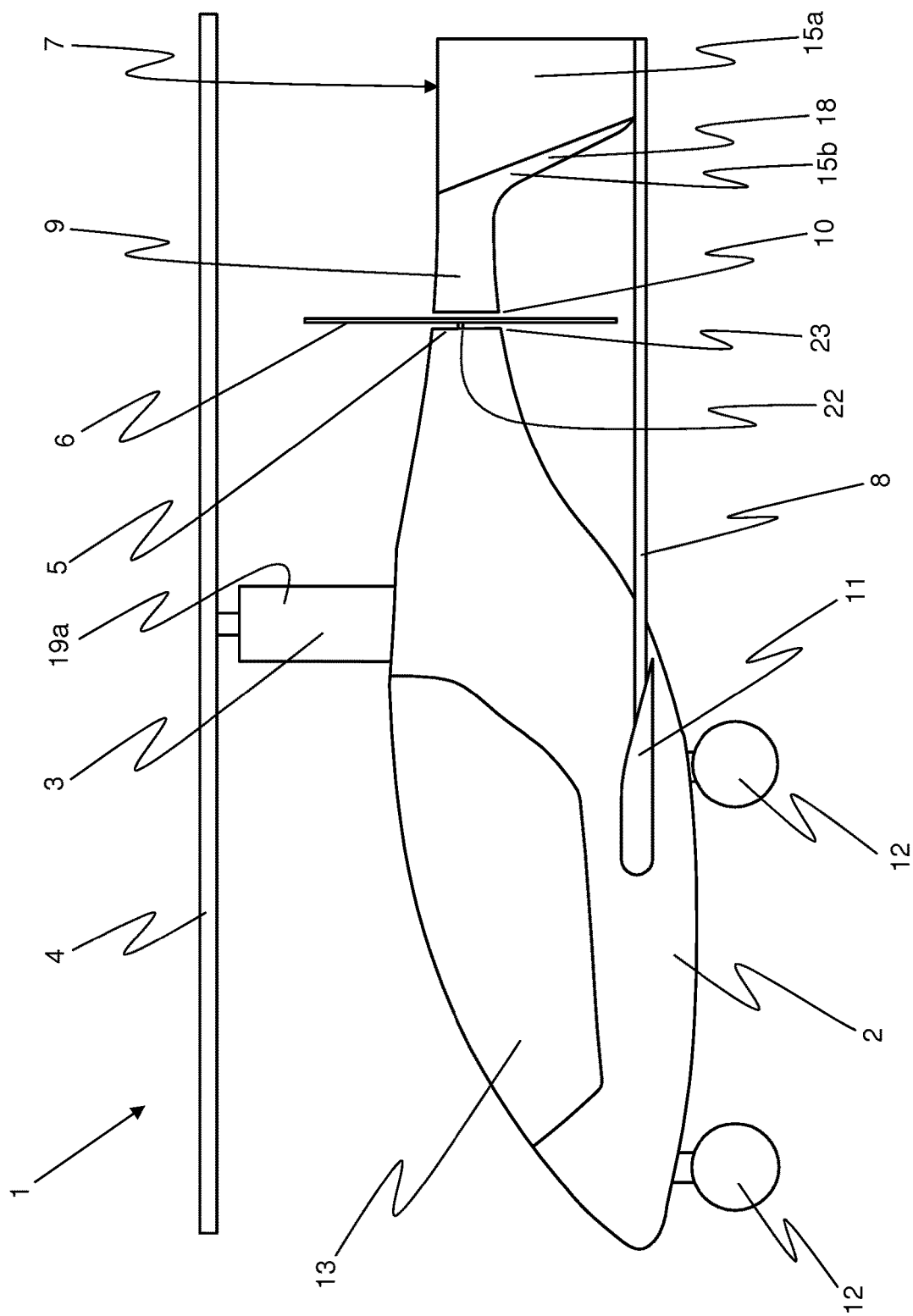
FIG. 1 a side view of a gyroplane with a horizontal stabilizer extension, which forms part of a streamlined outer contour of the gyroplane, FIG. 2 a cut-out of the gyroplane in the rear area of the fuselage according to an alternative embodiment of the streamlined outer contour with an additional propeller extension, FIG. 3 a cut-out of the gyroplane in the rear area of the fuselage according to an alternative embodiment of the streamlined outer contour with a rotary propeller, FIG. 4 a rear view of the gyroplane without a horizontal stabilizer with a split mast, and FIG. 5 a rear view of the gyroplane with a horizontal stabilizer having three horizontal stabilizer sections and an alternatively shaped fuselage.

FIG. 1 shows a side view of a gyroplane 1 with a streamlined outer contour. A fuselage 2 forms the basic body of the gyroplane 1. The fuselage 2 features wheels 12 on its lower side. A passenger cabin 13 is arranged in a front area of the fuselage 2. A mast 3 is arranged in an area on the upper side of the fuselage 2. A rotor 4 is rotatably arranged at an upper end of the mast 3. The rotor 4 is set in autorotation by an air flow coming from the front and thus generates the lift of the gyroplane 1. The mast 3 transfers the lifting force from the rotor 4 to the fuselage 2.

The fuselage 2 features a rear fuselage end 5. At the rear fuselage end 5, a propeller 6 is arranged, by means of which the propulsion of the gyroplane 1 can be generated. The propeller 6 is connected in a torque-proof manner to a drive shaft 22 that extends out of the fuselage 2 at the fuselage end 5. A horizontal stabilizer 7 is arranged partially behind the propeller 6 in the longitudinal direction of the propeller. In this embodiment, the horizontal stabilizer 7 is indirectly connected to the fuselage 2 by means of two struts 8 on the wings 11. The wing 11 and the strut 8 herein exist symmetrically with respect to the longitudinal axis of the gyroplane 1; that is, the gyroplane 1 features a wing 11 and a strut 8 on its left and right sides. An additional embodiment for connecting the horizontal stabilizer 7 to the fuselage 2 is the use of only one strut 8 that connects the horizontal stabilizer 7 to the fuselage 2 centrally in the longitudinal direction under the propeller 6.

The horizontal stabilizer 7 features a horizontal stabilizer extension 9 that is directed towards the front in a coaxial manner with respect to the rear fuselage end 5. This is connected to the horizontal stabilizer 7 and preferably merges smoothly into a side horizontal stabilizer 18 of the horizontal stabilizer 7. The side horizontal stabilizer 18 is arranged centrally with respect to the transverse axis of the gyroplane 1. Furthermore, the side horizontal stabilizer 18 is directed downwards. The horizontal stabilizer extension 9 forms a streamlined outer contour at least with the area of the rear fuselage end 5. An air flow around this streamlined outer contour forms a close-fitting flow. Thus, such a streamlined outer contour of the gyroplane 1 reduces the detachment of the air flow from the streamlined outer contour, reduces fuel consumption and results in a more stable flight behavior.

A gap 10 separates the rear fuselage end 5 with the propeller 6 arranged therefrom from the horizontal stabilizer extension 9 and thus from the horizontal stabilizer 7. A transfer of vibrations, produced by the propeller 6, to the horizontal stabilizer 7 is prevented by the gap 10. Likewise, a transfer of vibrations from the horizontal stabilizer to the fuselage 2 is prevented. This improves flight performance, and makes flight behavior more calm, given the reduced vibrations.

Figure 6:
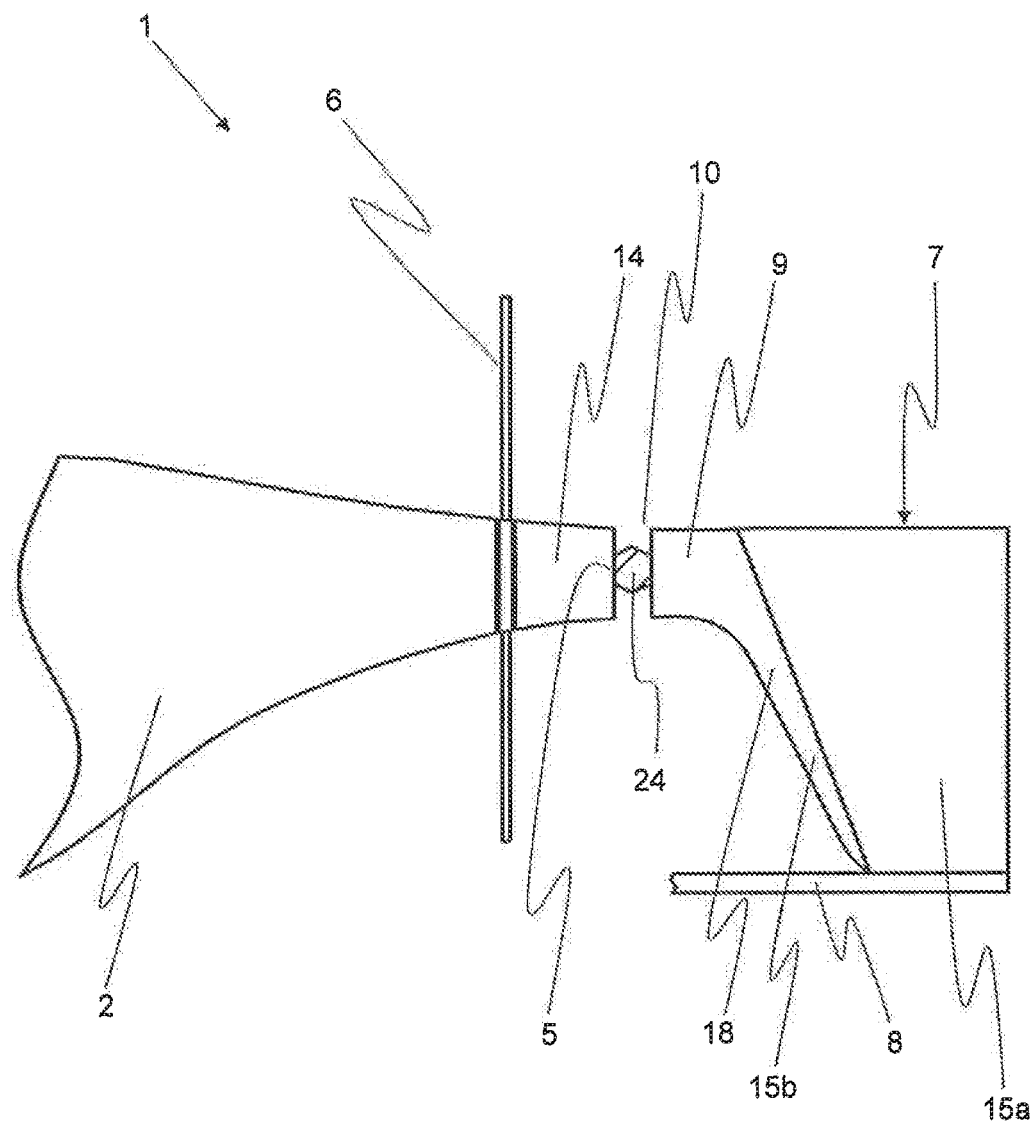

In one embodiment that shown schematically in FIG. 6, the gyroplane may feature a damping element 24. The damping element 24 comprises a bearing that is decoupled from vibrations, such as an elastomer bearing, as a result of which the damping element 24 transfers no vibrations or only very few vibrations. The damping element 24 preferably extends in a partial area of the gap 10 (that is, not over the entire volume of free space formed by the gap 10), but over the entire length of the gap 10. In this manner, despite the vibration decoupling caused by the gap 10, a certain constant spacing of the horizontal stabilizer 7 can be ensured. Thus, the damping element 24 connects the horizontal stabilizer extension 9 to the fuselage 2 and/or (according to the embodiment described in FIG. 2 below) to a propeller extension 14, in a vibration-damping and/or distance-maintaining manner.

Figure 2:
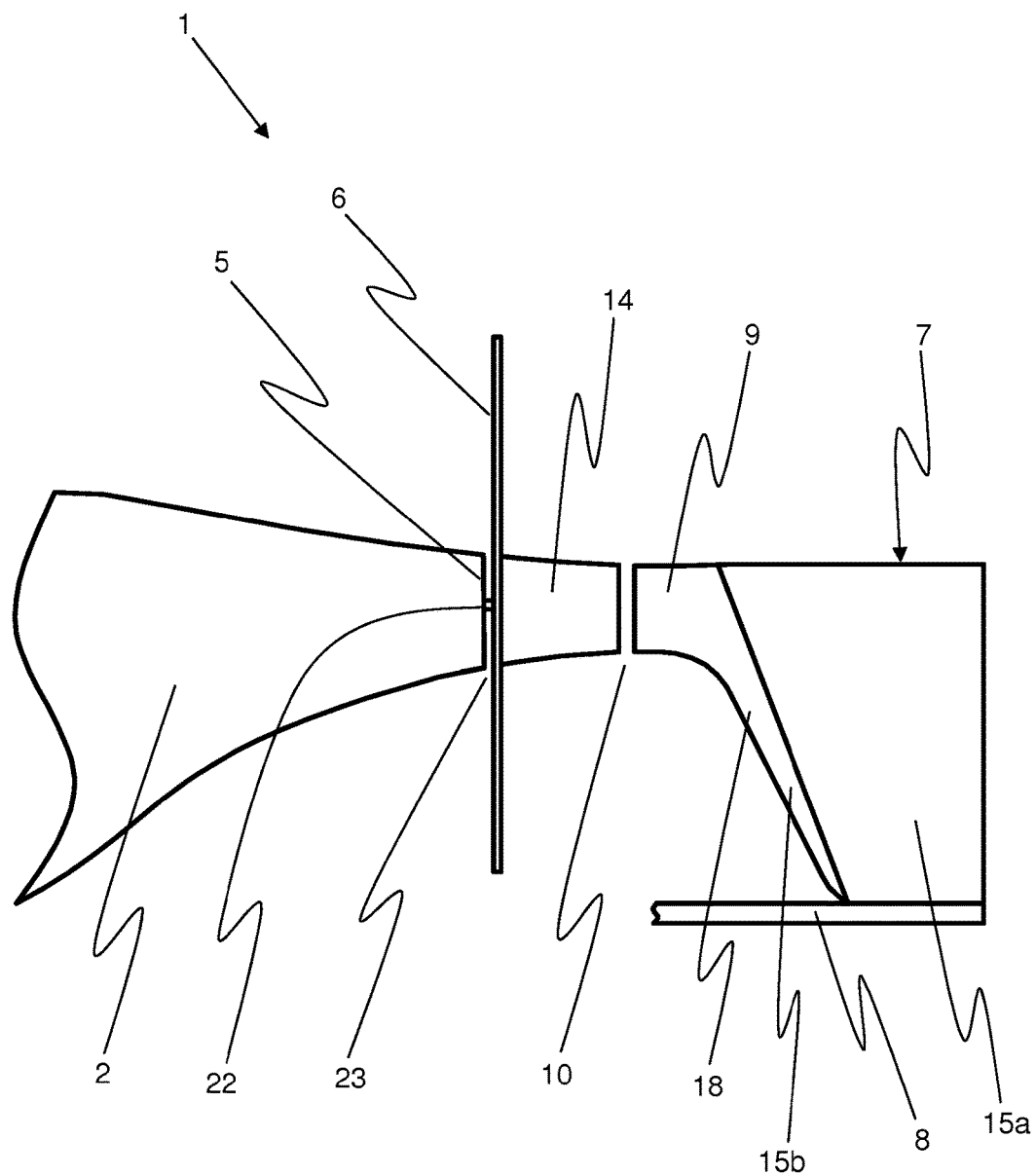

FIG. 2 shows a cut-out of the gyroplane in the rear area of the fuselage according to an alternative embodiment of the streamlined outer contour with an additional propeller extension 14. Therein, the propeller 6 is arranged at the rear fuselage end 5. The propeller extension 14 is fixed in a torque-proof manner to the propeller 6, such that the propeller extension 14 rotates along with a rotation of propeller 6. The shape of the propeller extension 14 is adapted in a streamlined manner to the shape of the fuselage 2 in the area of the rear fuselage end 5. Likewise, the shape of the propeller extension 14 is adapted in a streamlined manner to that of the horizontal stabilizer extension 9. Thus, the propeller extension 14 forms a part of the streamlined outer contour. The same applies to the horizontal stabilizer extension 9 and/or the side horizontal stabilizer 18. Due to the streamlined outer contour, a substantially close-fitting air flow flows at least from the area of the rear fuselage end 5 and over the propeller extension 14 to the horizontal stabilizer extension 9, and is forwarded to the side horizontal stabilizer 18. Such a close-fitting air flow leads to lower fuel consumption, more stable flight behavior and a lower noise development.

In this embodiment, the gap 10 is arranged between the propeller extension 14 and the horizontal stabilizer extension 9. Thus, the horizontal stabilizer 7 is decoupled from vibrations from the propeller 6.

So that the propeller 6 can rotate together with the propeller extension 14 with respect to the fuselage 2, a second gap 23 is formed in the longitudinal direction of the gyroplane between the rear fuselage end 5 and the propeller extension 14.

Figure 3:
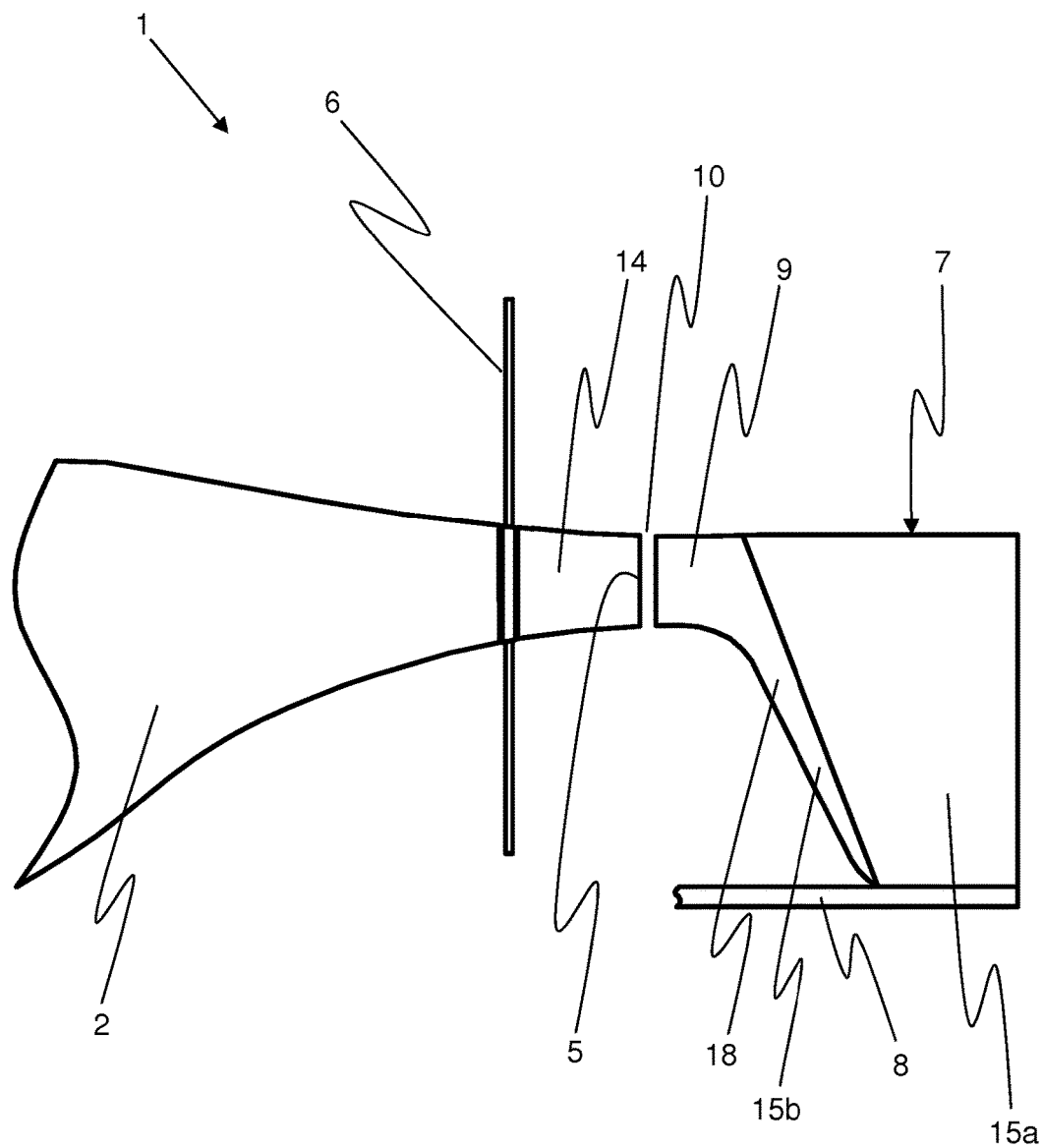

FIG. 3 shows a cut-out of the gyroplane in the rear area of the fuselage according to an alternative embodiment of the streamlined outer contour with a rotary propeller. In this embodiment, the propeller 6 is formed as a rotary propeller 6. Thus, the propeller 6 is arranged in a manner spaced from the fuselage end 5 in the direction of the fuselage 2, and can rotate around the rear area of the fuselage 2.

The propeller extension 14 is arranged behind the rotary propeller 6; this is formed as part of the fuselage 2. Accordingly, the propeller extension 14 does not rotate with the propeller 6. With the fuselage 2, the propeller extension 14 forms a part of the streamlined outer contour. Likewise, with the horizontal stabilizer extension 9 and the side horizontal stabilizer 18, the propeller extension 14 forms a part of the streamlined outer contour. Due to the streamlined outer contour, a substantially close-fitting air flow flows at least from the area of the rear fuselage end 5, over the propeller extension 14 to the horizontal stabilizer extension 9 and from there to the side horizontal stabilizer 18. Such an air flow leads to lower fuel consumption, more stable flight behavior and lower noise development.

In this embodiment, the gap 10 is arranged between the propeller extension 14 and the horizontal stabilizer extension 9, and mechanically decouples from vibrations the horizontal stabilizer 7 from the propeller 6.

Figure 4:
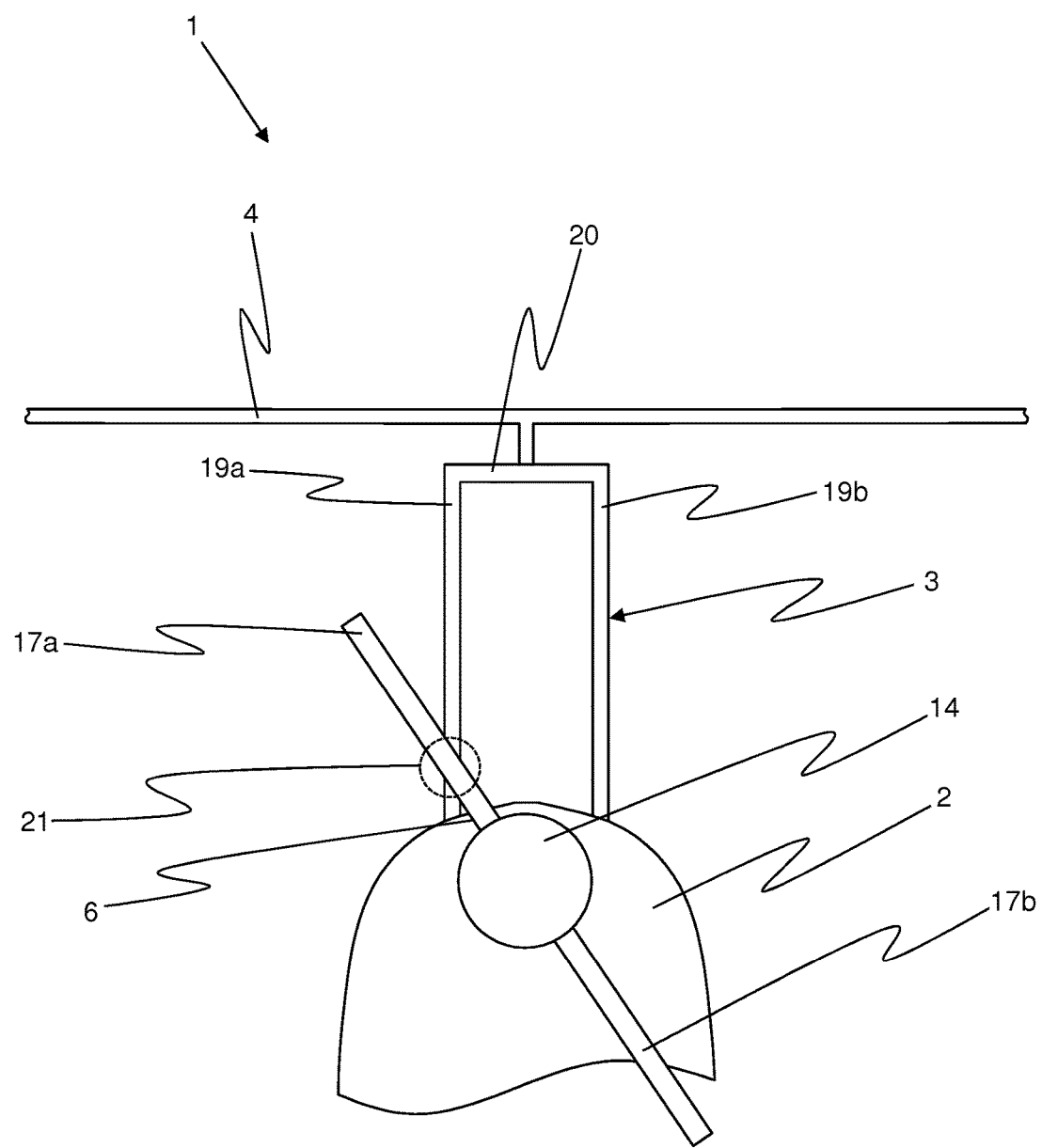

FIG. 4 shows a rear view of the gyroplane without a horizontal stabilizer with a split mast. In this embodiment, the mast 3 is divided. The mast 3 features two side parts 19a, 19b, which are spaced from each other in the transverse direction of the gyroplane. A roof part 20, which is connected to the side parts 19a, 19b, is arranged on its ends turned away from the fuselage 2. The rotor 4 is rotatably mounted in the roof part 20. In this embodiment, the side parts 19a, 19b are arranged vertically and/or parallel to each other. Alternatively, however, according to the embodiment shown in FIG. 5, the side parts 19a, 19b can also be inclined towards each other, such that the roof part 20 is shortened in the transverse direction of the gyroplane. Alternatively, the side parts 19a, 19b can be inclined towards each other in such a manner that they converge at the top, as a result of which one roof part 20 can be dispensed with. In an additional embodiment (not shown), the side parts 19a, 19b can be inclined away from each other. In addition or alternatively, it is advantageous if the side parts 19a, 19b and/or the roof part 20 are curved, concave and/or convex.

As a result of the division of the mast 3, as shown in the embodiment presented in FIG. 4, at no point in time is a propeller blade 17a completely behind the mast 3. An overlapping area 21 is formed by, in the rear view, the propeller blade 17a overlapping with the side part 19a of the mast 3. The propeller blade 17b is lying opposite the propeller blade 17a. Alternatively, the propeller 6 may also feature more than two propeller blades 17. The propeller 6 may be formed, for example, as a 3-blade, 4-blade or 5-blade propeller.

The inflow of the propeller 6 resulting from the flight speed and the propulsion brings about a force on the propeller blades 17a, 17b directed in the direction of flight. If a propeller blade 17 disappears behind the mast 3 or dips into the lee of the mast 3, the lee of the mast 3 brings about a change in the resulting inflow, which results in a sudden load change. However, at this point in time, the at least one other propeller blade 17 is not located in the lee of the mast 3, and experiences a virtually undisturbed inflow, which consequently brings about a uniform force on the propeller blade 17. The force oscillating in various strengths at the propeller blades 17a, 17b leads to oscillating loads and faster wear. On the other hand, the oscillating forces on the propeller blades 17a, 17b also produce vibrations, which likewise spread to the fuselage 2, lead to the material fatigue of the components there and can be uncomfortable for the persons in the gyroplane 1. Due to the fact that the propeller blades 17a, 17b never lie completely in the lee of the mast 3, but are always flowed through without disturbance over a substantial area, the oscillating force is lessened, which results in a lower material fatigue of the components and a reduction in the vibrations.

Figure 5:
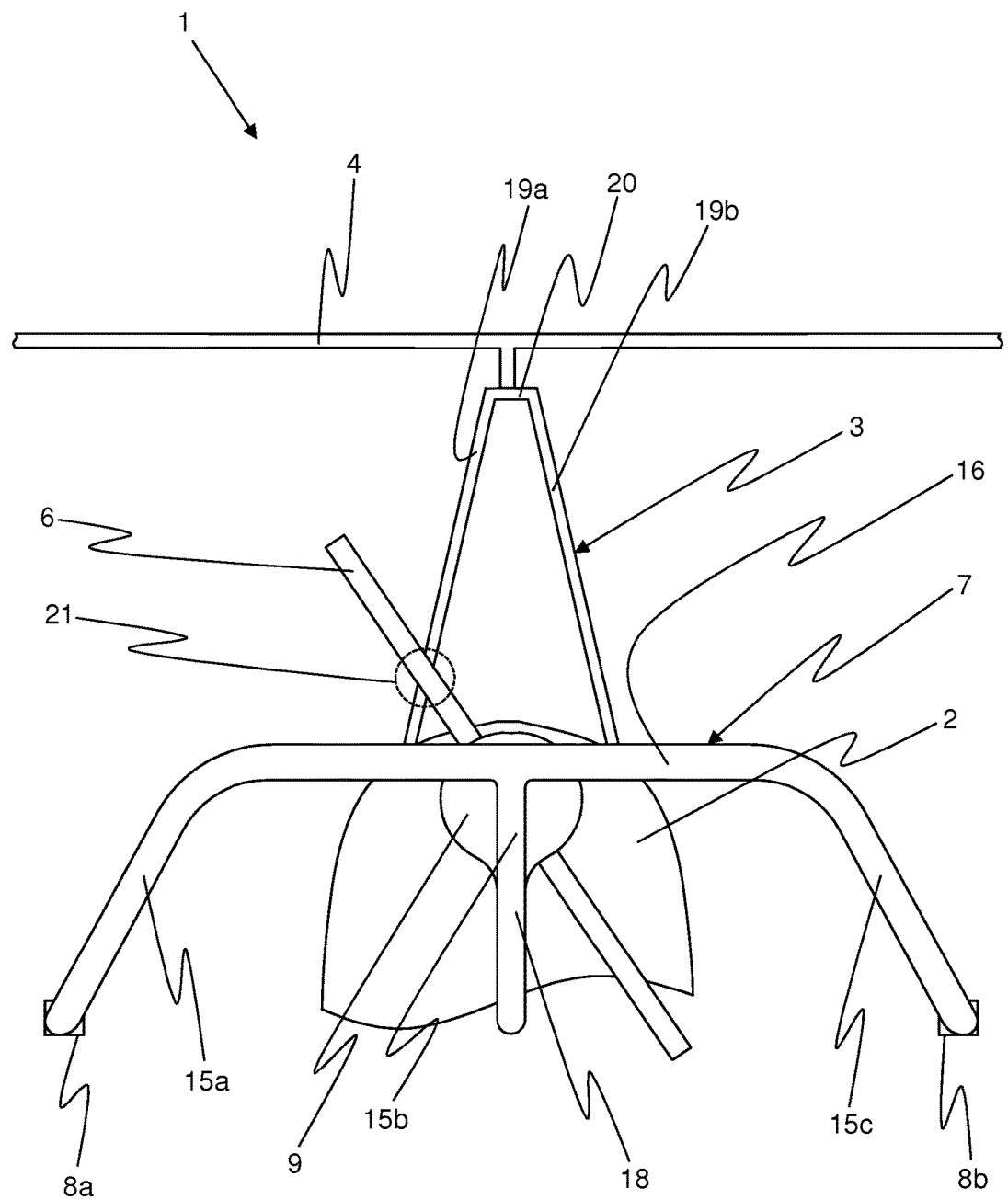

FIG. 5 shows a rear view of the gyroplane 1 with the horizontal stabilizer 7. The mast 3 is formed in two parts. In this embodiment, the mast 3 comprises the two side parts 19a, 19b, which are inclined towards each other with respect to the center of the gyroplane 1. The two side parts 19a, 19b are connected to the roof part 20 at their ends. The roof part rotatably accommodates the rotor 4. The two side parts 19a, 19b are inclined relative to the axis of the gyroplane.

On the upper side, the horizontal stabilizer 7 features a support section 16 extending in the transverse direction of the gyroplane. In one embodiment that is not shown here, a part of this support section 16 can be designed as an elevator.

Three downwardly directed horizontal stabilizer sections 15a, 15b, 15c are arranged on such support section 16. They act in a stabilizing manner against a rotation of the gyroplane 1 around its vertical axis. In the embodiment shown, the middle horizontal stabilizer section 15b is formed as a side horizontal stabilizer 18. The side horizontal stabilizer 18 is arranged centrally with respect to the transverse direction of the gyroplane 1. The gyroplane 1 can be controlled by means of the middle horizontal stabilizer section 15b forming the side horizontal stabilizer 18.

In an alternative embodiment, the two outer horizontal stabilizer sections 15a, 15c can also be designed as rudders. The horizontal stabilizer sections can be aligned parallel to each other. Likewise, the two outer horizontal stabilizer sections 15a, 15c according to FIG. 5 can be inclined inwards. Alternatively, the horizontal stabilizer sections 15a, 15c may be inclined outwards. With the support section 16, the two outer horizontal stabilizer sections 15a, 15c form a downwardly U-shaped unit. This is designed either with the middle horizontal stabilizer section 15b and/or the horizontal stabilizer extension 9 in one or more parts.

In the front, the horizontal stabilizer extension 9 is following the side horizontal stabilizer 18. Herein, the transition from the side horizontal stabilizer 18 to the horizontal stabilizer extension is fluid, such that a streamlined outer contour is formed. An air flow around such a streamlined outer contour forms a substantially close-fitting flow, by which fuel is saved, flight behavior is improved and noise is reduced.

Likewise, with the support section 16, two of the horizontal stabilizer sections 15a, 15b, 15c form a downwardly directed U-shaped form. Thus, with a part of the support section 16, the horizontal stabilizer sections 15a, 15b form a first downward U-shape. Together with a part of the support section 16, the horizontal stabilizer sections 15b, 15c form a second downwardly directed U-shape.

In this embodiment, one of the struts 8a, 8b is attached to each of the two outer horizontal stabilizer sections 15a, 15c. The two struts 8a, 8b shown in FIG. 5 extend forward and can be connected to wings shown in FIG. 1 or directly to the fuselage 2.

Alternatively, the gyroplane 1 may also feature a single strut 8. The single strut 8 then connects the horizontal stabilizer 7 to the fuselage 2 via the middle horizontal stabilizer section 15b. Preferably, as schematically shown in FIG. 2, the single strut 8 herein extends below the propeller 6 from the horizontal stabilizer section 15b to the fuselage 2.

This invention is not limited to the illustrated and described embodiments. Variations within the scope of the claims, just as the combination of characteristics, are possible, even if they are illustrated and described in different embodiments.

LIST OF REFERENCE SIGNS

1. Gyroplane
2. Fuselage
3. Mast
4. Rotor
5. Rear fuselage end
6. Propeller
7. Horizontal stabilizer 8. Strut
9. Horizontal stabilizer extension
10. First gap
11. Wing
12. Wheel
13. Passenger cabin
14. Propeller extension
15. Horizontal stabilizer section
16. Support section
17. Propeller blade
18. Side horizontal stabilizer
19. Side part
20. Roof part
21. Overlapping area
22. Drive shaft
23. Second gap
24. Damping element

The invention claimed is:

1. A gyroplane, comprising:
a fuselage defining a forward end and a rear end displaced apart downstream from the forward end along a longitudinal direction of the fuselage;
a mast arranged between the forward end and the rear end of the fuselage, a free end of the mast extending away from the fuselage in a vertical direction;
a rotor arranged in a rotatable manner at the free end of the mast, the rotor being configured and disposed so that the rotor can be set in autorotation by an air flow flowing from the forward end toward the rear end of the fuselage and thereby generate lift transmitted to the fuselage via the mast;
a propeller configured and disposed in the area of the rear end of the fuselage and drivable to produce propulsion of the gyroplane;
a horizontal stabilizer arranged downstream of the propeller;
a strut connecting the horizontal stabilizer to the fuselage and including a first section that extends away from the propeller in the longitudinal direction;
a horizontal stabilizer extension disposed between the rear end of the fuselage and the horizontal stabilizer and extending in a coaxial manner with respect to the rear end of the fuselage, the horizontal stabilizer extension being spaced from the rear end of the fuselage in such a manner that a gap is formed between horizontal stabilizer extension and the rear end of the fuselage; and
wherein the rear end of the fuselage and the horizontal stabilizer extension together form a streamlined outer contour.

2. A gyroplane according to claim 1, wherein the strut includes a second section that is spaced from the propeller along a radially outward direction that is perpendicular to the longitudinal direction.

3. A gyroplane according to claim 1, further comprising a propeller extension connected to the propeller extending downstream from the propeller and shaped in a streamlined manner with respect to both the rear end of the fuselage and the horizontal stabilizer extension.

4. A gyroplane according to claim 3, wherein in the downstream direction the length of the propeller extension differs from the length of the horizontal stabilizer extension.

5. A gyroplane according to claim 3, wherein the gap is disposed between the propeller extension and the horizontal stabilizer extension.

6. A gyroplane according to claim 3, wherein the propeller extension is connected to the propeller in a torque-proof manner, such that the propeller extension rotates along with the propeller.

7. A gyroplane according to claim 1, further comprising a motor shaft projecting beyond and rotatable with respect to the rear end of the fuselage, wherein the propeller is formed as a rotary propeller and connected to the motor shaft.

8. A gyroplane according to claim 1, further comprising a first wing arranged at a first side of the fuselage, a second wing arranged at a second side of the fuselage opposite the first side, and wherein the horizontal stabilizer is connected to the fuselage via the first wing by a first strut and via the second wing by a second wherein the first strut is spaced in the transverse direction from the second strut.

9. A gyroplane according to claim 1, wherein the horizontal stabilizer includes a side horizontal stabilizer arranged in a coaxial manner with respect to the horizontal stabilizer extension and forming a part of the streamlined outer contour along with the horizontal stabilizer and the rear end of the fuselage.

10. A gyroplane according to claim 9, wherein the horizontal stabilizer and the side horizontal stabilizer are formed as a contiguous unitary structure.

11. A gyroplane according to claim 9, wherein the horizontal stabilizer includes three horizontal stabilizer sections, whereas at least one of the three horizontal stabilizer sections is formed as the side horizontal stabilizer with a rudder and the three horizontal stabilizer sections are spaced apart from one another in the transverse direction of the gyroplane.

12. A gyroplane according to claim 11, wherein the horizontal stabilizer features a wing arranged in the transverse direction that is perpendicular to both the vertical direction and the longitudinal direction, wherein each of the three horizontal stabilizer sections is arranged in a manner extending from the wing downwards in the vertical direction opposite from the direction of the mast such that two adjacent ones of the three horizontal stabilizer sections and the wing form a U-shape that is directed downwards.

13. A gyroplane according to claim 1, wherein the propeller includes a plurality of blades, and wherein the mast is configured relative to the propeller such that the blades of the propeller always overlap only partially with the mast in a respective overlapping area during rotation of the propeller.

14. A gyroplane according to claim 13, wherein the mast includes a roof part and at least two side parts, each of the side parts has a first end connected to the roof part and a second end spaced apart from the first end and connected to the fuselage.

15. A gyroplane according to claim 14, wherein the side parts extend in the vertical direction parallel to each other.

16. A gyroplane according to claim 1, wherein the gyroplane includes a damping element, which extends in a partial area of the gap over the entire length of the gap and connects the horizontal stabilizer extension at a distance to the fuselage.

17. A gyroplane according to claim 16, wherein the damping element has a first end connected to the horizontal stabilizer extension in a torque-proof manner, and wherein the damping element has a second end connected rotatably to the propeller extension.

* * * * *